United States Patent [19]
Nemoto

[11] Patent Number: 4,532,583
[45] Date of Patent: Jul. 30, 1985

[54] METHOD AND APPARATUS FOR CONTROLLING AN INVERTER
[75] Inventor: Yoichi Nemoto, Tokyo, Japan
[73] Assignee: Tokyo Shibaura Denki Kabushiki Kaisha, Kanagawa, Japan
[21] Appl. No.: 451,421
[22] Filed: Dec. 20, 1982
[30] Foreign Application Priority Data
Dec. 24, 1981 [JP] Japan ............... 56-208167
[51] Int. Cl.³ ............................ H02P 13/20
[52] U.S. Cl. ........................ 363/96; 363/58; 363/136
[58] Field of Search .............. 363/49, 55, 56, 57, 363/58, 95, 96, 135, 136; 318/800, 801, 805, 809

[56] References Cited
U.S. PATENT DOCUMENTS
3,541,423 11/1970 Kelley, Jr. et al. .......... 363/96
4,237,531 12/1980 Cutler et al. ................ 363/58
4,275,281 6/1981 Kiuchi ........................ 363/135

FOREIGN PATENT DOCUMENTS
113835 9/1979 Japan ........................ 363/96

Primary Examiner—Peter S. Wong
Assistant Examiner—Anita M. Ault
Attorney, Agent, or Firm—Stevens, Davis, Miller & Mosher

[57] ABSTRACT

A method of and apparatus for controlling an inverter of a load commutation type, the inverter having arms each having a thyristor in which pulses are produced and distributed to the gates of the thyristors for performing, under normal circumstances, constant margin time control or constant margin angle control. The voltage across the load is detected and its magnitude is compared with a predetermined level. When the magnitude exceeds the predetermined level, a pulse is produced and delivered through the distributor to the gates of the thyristors.

4 Claims, 10 Drawing Figures

FIG. 1
PRIOR ART
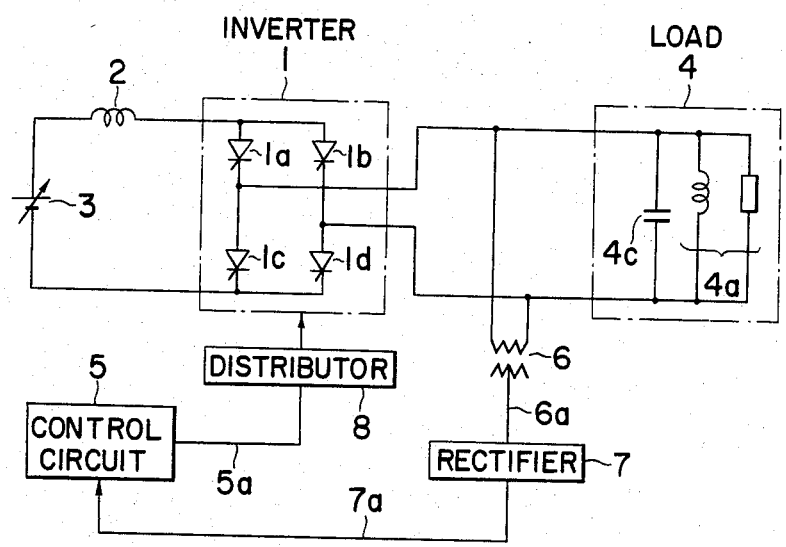
PRIOR ART
FIG. 2A
FIG. 2B
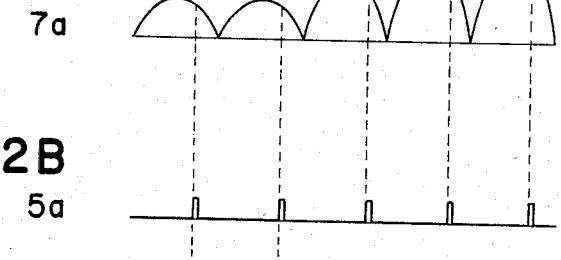

FIG. 4
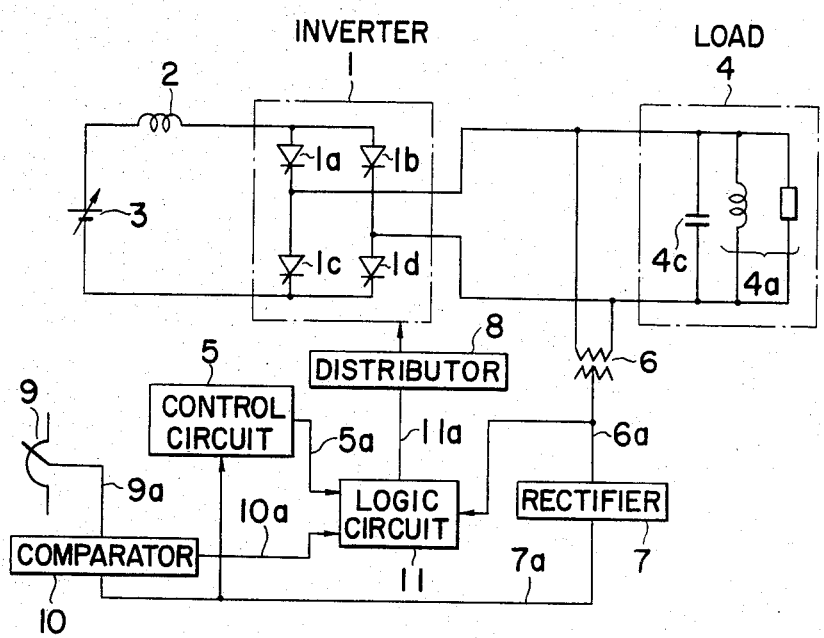
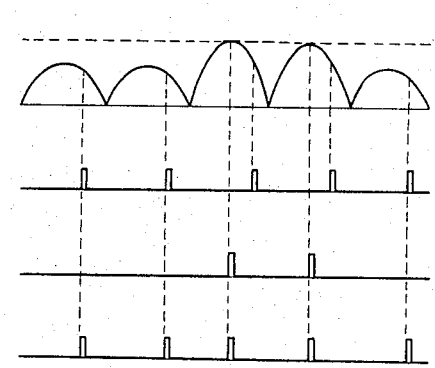
FIG.5A 9a 7a
FIG.5B 5a
FIG.5C 10a
FIG.5D 11a

METHOD AND APPARATUS FOR CONTROLLING AN INVERTER

BACKGROUND OF THE INVENTION

The present invention relates to a method and apparatus for controlling an inverter of the load commutation type.

Inverters of the load commutation type are often used as a power source for an induction heating apparatus, such as an induction furnace, an induction heater or the like, as, for example, shown in FIG. 1. As illustrated, the input or DC terminals of a load commutation type inverter 1 is connected through a DC reactor 2 to a controllable DC power source 3. The output or AC terminals of the inverter 1 are connected to a load 4 comprising an induction furnace or heater 4a with a parallel capacitor 4c for phase advancement. The load 4 is shown in the form of an equivalent tank circuit.

The inverter 1 is of a current type, as is often the case where an inverter is used as a power source for an induction heating apparatus. The inverter 1 is operated at a frequency corresponding or equal to the resonant frequency of the load tank circuit 4, which itself varies for various reasons, e.g., when the material to be heated is charged into the heating apparatus, or discharged, or when the temperature of the material to be heated varies.

The inverter 1 is provided with a constant margin time control circuit 5, which receives a signal obtained by a voltage detector 6 detecting the voltage between the terminals of the load 4 and supplied therefrom through a rectifier 7, whose output is shown in FIG. 2A. The control circuit 5 is of a type which performs a constant margin time control in which the time margin for turn-off of each thyristor of the respective one of the arms of the inverter is maintained constant. The control circuit 5 may, for example, have an internal construction as shown in FIG. 3. As illustrated, it comprises a zero detector 21 which receives the output 7a (FIG. 2A) of the rectifier 7 and produces a pulsative output 21a when the output 7a is zero. A sawtooth wave generator 22 produces a sawtooth waveform voltage 22a which is reduced to and starts at a zero level every time the output 7a becomes zero, and rises at a constant gradient. A subtractor 23 subtracts a predetermined constant value from the output 22a of the sawtooth wave generator 22. A latch circuit 24 samples the value of the output 23a of the subtractor 23 when the output 21a is produced, and stores the value obtained by sampling. Upon each sampling, the latch circuit 24 produces a pulse 24b which is used to reset the sawtooth wave generator 22, i.e., to bring the output 22a to the zero level. A comparator 25 compares the outputs 22a and 24a and produces a pulse 5a (FIG. 2B) when they are identical. The output 5a of the comparator 25 constitutes the output of the control circuit 5. The time interval between the production of the pulse 5a and the end of each half cycle of the voltage across the load 4, i.e., the time point at which the output 7a subsequently becomes zero is kept substantially constant provided that the frequency of the voltage across the load 4 does not vary rapidly, and hence constant margin time control is thereby achieved. An example of such a circuitry for achieving the constant margin time control is disclosed in Japanese Patent Publication No. 4102/1981.

The output signal of the control circuit 5 is delivered, through a distributor 8, as gate signals, to the thyristors forming respective arms of the inverter 1. More particularly, the distributor 8 supplies the incoming pulses to the thyristors of a first pair of arms 1a and 1d, during one half cycle of the voltage across the load, and to the thyristors of a second pair of arms 1b and 1c during the next half cycle, and alternately, in a similar manner, to the thyristors of the first pair, and the second pair during the subsequent half cycles. In this way, the frequency of the inverter 1 is automatically adjusted in accordance with the power factor of the load 4.

A disadvantage of the above-described system is that no-load start or no-load operation is not possible, and the voltage across the load 4 rises, when the load is too light, so high a value that the thyristors of the inverter 1 are damaged.

SUMMARY OF THE INVENTION

An object of the invention is to avoid damages to the thyristors and to enable start and operation of an inverter system under no or light load.

According to one aspect of the invention, there is provided a method of controlling an inverter of a load commutation type, having arms formed essentially of thyristors, in which pulses are produced and distributed through a distributor to the gates of the thyristors for performing, under normal circumstances, constant margin time control or constant margin angle control, the method comprising the steps of:
detecting the voltage across the load,
comparing the magnitude of the detected voltage with a predetermined level,
producing a pulse when the magnitude of the detected voltage exceeds the predetermined level, and
delivering the pulse through the distributor to the gates of the thyristors.

According to another aspect of the invention, there is provided a control system for an inverter of a load commutation type, the inverter having arms formed essentially of thyristors, the control system comprising:
detecting means for detecting the voltage across the load;
control circuit responsive to the detected voltage for producing pulses for performing constant margin time control or constant margin angle control,
a distributor responsive to the pulses from the commutation control circuit for distributing the pulses to the gates of the thyristors, and
comparing means for comparing the magnitude of the detected voltage with a predetermined level and producing a pulse when the magnitude of the detected voltage exceeds the predetermined level,
the distributor being also responsive to the pulses from the comparing means for distributing the pulses from the comparing means to the gates of the thyristors.

BRIEF DESCRIPTION OF THE DRAWINGS

In the accompanying drawings:

FIG. 1 is a diagram showing an inverter system with a conventional control system;

FIGS. 2A and 2B are waveform diagrams showing an operation of the control system shown in FIG. 1;

FIG. 4 is a diagram showing an inverter system with a control system of an embodiment of the invention;

FIGS. 5A–5D are waveform diagrams showing an operation of the control system shown in FIG. 4.

DETAILED DESCRIPTION OF THE PREFERRED EMBODIMENTS

Figure 3:
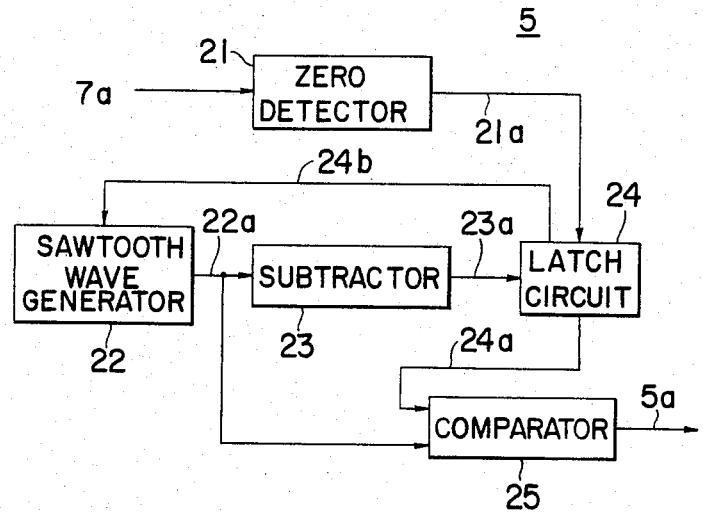
FIG. 3 is a block diagram showing an internal construction of an example of the constant margin time control circuit 5 shown in FIG. 1.

In FIG. 4, the same reference numerals as in FIG. 1 designate identical or similar components, so that description thereof is omitted.

A comparator 10 receives the output 7a of the rectifier 7, which is indicative of the magnitude of the detected voltage. The comparator 10 also receives a voltage 9a of a predetermined reference value from a voltage reference generator 9. The comparator 10 compares the instantaneous value of the output 7a of the rectifier 7 with the voltage 9a (shown by dotted lines in FIG. 5A) from the reference generator 9 and produces a pulse (FIG. 5C) when the former exceeds the latter.

A logic circuit 11 is connected to receive the output of the voltage detector 6, and the pulses from the control circuit 5 and the comparator 10, and permits passage of the pulse from either the control circuit 5 or the comparator 10 whichever is the earlier to supply the pulse during each half cycle of the voltage across the load 4.

Figure 6:
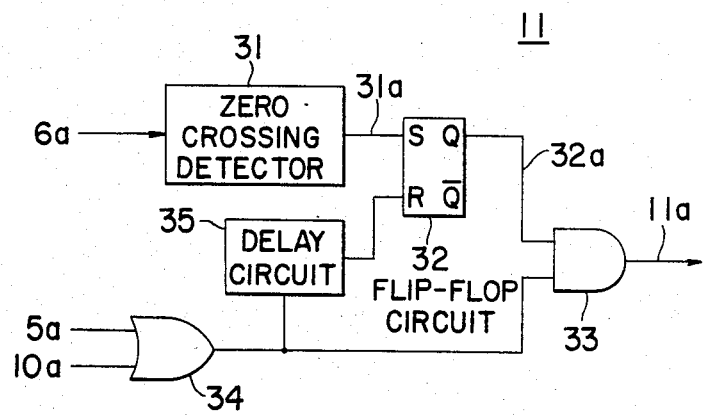
FIG. 6 is a block diagram showing an internal construction of an example of the logic circuit 11 shown in FIG. 4.

The logic circuit 11 may, for example, have an internal construction as shown in FIG. 6. As illustrated, it comprises a zero crossing detector 31 which receives the output 6a of the detector 6 and produces a pulsative output 31a when the output 6a crosses the zero level. A set-reset type flip-flop circuit 32 receives, as the set input S, the pulse 31a and is therefore set when each half cycle of the voltage across the load 4 begins. The Q output 32a of the flip-flop circuit 32 is applied to one input of an AND gate circuit 33, which receives at the other input, the output 5a (FIG. 5B) or 10a (FIG. 5C), through an OR gate circuit 34. The output of the OR gate circuit 34 is also applied through a delay circuit 35 to the reset input R of the flip-flop circuit 32, thereby to reset the flip-flop circuit 32. The output 32a of the flip-flop circuit 32 is therefore at a high level until a little time after the first appearance, during each half cycle, of a pulse at the output of the OR gate circuit 34. The pulse 5a or 10a which is the first to appear, during each half cycle, at the output of the OR gate circuit 34 is thus allowed to pass through the AND gate circuit 33. Any pulse which subsequently appears during the same half cycle is blocked by the AND gate circuit 33, since the flip-flop circuit 32 has been reset by the time such subsequent appearance of the pulse takes place. The output 11a (FIG. 5D) of the AND gate circuit 33 constitutes the output of the logic circuit 11, and is supplied through the distributer 8, to the gates of the thyristors of the inverter 1.

As long as the voltage across the load 4 does not exceed, in magnitude, the predetermined level, and hence the output 7a (FIG. 5A) of the rectifier 7 does not exceed the level 9a set by the reference generator 9, the comparator 10 produces no output (FIG. 5C), so that the output 5a (FIG. 5B) of the control circuit 5 is supplied through the logic circuit 11 and the distributor 8, to the inverter 1 and the constant margin time control is effected.

When the load becomes light, and the voltage across the load rises, and the output 7a (FIG. 5A) of the rectifier 7 exceeds the level set by the reference generator 9, the comparator 10 produces a pulse (FIG. 5C) and such pulse passes through the logic circuit 11 (FIG. 5D) and is supplied through the distributor 8 to the inverter 1. Thus the thyristors forming the arms of the inverter 1 are switched at an earlier time point or phase angle. As a result, the direction of the load current is reversed, and the transfer of energy to the load is reduced. For this reason, the voltage is reduced, and the damage to the thyristors is thereby avoided.

In the foregoing embodiment, the control circuit 5 is of a type which performs a constant margin time control. But the present invention is also applicable where a control circuit which performs constant margin angle control.

In the foregoing embodiment, the logic circuit 11 permits passage of the pulse which is the first, during each half cycle, to appear from the control circuit 5 or the comparator 10. But, the logic circuit 11 may alternatively be so constructed as to permit all of the pulses supplied from the control circuit 5 and the comparator 10 to the inputs of the logic circuit 11. The distributor 8 distributes all the pulses inputted thereinto during each half cycle to the same thyristors, so that the second pulse is not effective since the thyristors are already turned on by the first pulse.

What is claimed is:

1. A method of controlling an inverter of a load commutation type, said inverter having arms each comprising a thyristor, in which pulses are produced and distributed through a distributor to the gates of the thyristors for performing, under normal circumstances, constant margin time control or constant margin angle control of a cyclic voltage applied across a load, said method comprising the steps of:
   generating a first pulse in a half cycle of the voltage across a load for performing a constant margin time or constant margin angle control,
   detecting the voltage across a load in said half cycle,
   comparing the instantaneous magnitude of the detected voltage with a predetermined level,
   producing a second control pulse as soon as the instantaneous magnitude of the detected voltage exceeds the predetermined level, and
   delivering the earlier occurring of the first pulse and the second control pulse in a half cycle of said voltage through the distributor to the gates of the thyristors.

2. A method as set forth in claim 1, further comprising the step of rectifying the detected voltage, and wherein said step of comparing comprises comparing the rectified voltage with the predetermined level.

3. A control system for an inverter of a load commutation type, said inverter producing and controlling the application of a cyclic voltage across a load and having arms each comprising a thyristor, said control system comprising:
   detecting means for detecting the voltage across the load in a half cycle thereof,
   a control circuit responsive to the detected voltage for producing a first pulse for performing at least one of constant margin time control and constant margin angle control,
   comparing means for comparing the instantaneous magnitude of the detected voltage with a predetermined level and producing a second pulse as soon as the instantaneous magnitude of the detected voltage exceeds the predetermined level, and a distributor responsive to said first and second pulses for distributing the first occurring of said first and second pulses in a half cycle of said voltage to the gates of the thyristors.

4. A system as set forth in claim 3, further comprising a rectifier rectifying the detected voltage for producing a rectified voltage, wherein said comparing means compares the rectified voltage with the predetermined level.

* * * * *